(12) United States Patent
Matsuki

(10) Patent No.: US 7,398,545 B2
(45) Date of Patent: Jul. 8, 2008

(54) USER DATA MANAGEMENT DEVICE HAVING A NOTIFICATION DETERMINATION DEVICE THAT DETERMINES WHO IS PROVIDED WITH IDENTITY DATA, STORAGE MEDIUM WHICH STORES A CONTROL PROGRAM, AND CONTROL METHOD

(75) Inventor: Yoshitaka Matsuki, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 383 days.

(21) Appl. No.: 10/908,982

(22) Filed: Jun. 3, 2005

(65) Prior Publication Data

US 2006/0277407 A1 Dec. 7, 2006

(51) Int. Cl.
*G06F 21/00* (2006.01)
(52) U.S. Cl. ............................................ 726/2; 380/51
(58) Field of Classification Search ......... 713/182–186; 726/2, 16–19; 358/1.1–498; 380/51, 55
See application file for complete search history.

(56) References Cited

U.S. PATENT DOCUMENTS 6,519,048 B1 * 2/2003 Tanaka ....................... 358/1.13
6,601,012 B1 * 7/2003 Horvitz et al. ............... 702/150
2005/0105129 A1 * 5/2005 Takahashi ................... 358/1.15

FOREIGN PATENT DOCUMENTS

JP          A-H06-191128          7/1994

* cited by examiner

*Primary Examiner*—Gilberto Barron, Jr.
*Assistant Examiner*—Shahrouz Yousefi
(74) *Attorney, Agent, or Firm*—Global IP Counselors, LLP

(57) ABSTRACT

A user data management device, a storage medium which stores a control program, and a control method are disclosed which efficiently report the identity of a user who is using equipment to some or all members of the department in which that equipment is located, or to managers of that department, in order to be informed of the use status of that equipment, and control the use of that equipment by unauthorized users. The user data management device includes input means that inputs user data belonging to a user that will use the equipment, notification means that will provide one or more persons with identity data concerning a user who is using the equipment in which the user data was input, authentication means that authenticates the user from the user data, and notification determination means that will determine one or more persons to be provided with identity data, and then provide identity data to them that identifies the user authenticated with the authentication means by means of the notification means.

15 Claims, 10 Drawing Sheets

User data input

Department code  XXXXXXX

Password  XXXXXXXXXX

Authenticate

*Fig. 5*

Authentication table

| Department code | Password |
|---|---|
| XXXXXXX | XXXXXXXXXX |
| YYYYYYY | YYYYYYYYYY |
| ⋮ | ⋮ |

*Fig. 6*

USER DATA MANAGEMENT DEVICE HAVING A NOTIFICATION DETERMINATION DEVICE THAT DETERMINES WHO IS PROVIDED WITH IDENTITY DATA, STORAGE MEDIUM WHICH STORES A CONTROL PROGRAM, AND CONTROL METHOD

BACKGROUND OF THE INVENTION

1. Field of the Invention

The present invention relates to a user data management device, and more particularly to a user data management device that manages the use status of equipment in a department.

In addition, the present invention relates to a storage medium that stores a control program for the user data management device, and a control method that is performed in the user data management device.

2. Background Information

The network printer technology described below is conventionally used to manage a department.

When an operator orders printing to be performed with a network printer, both print data and the name of the operator are transmitted to the printer, and the name of the operator is displayed on a liquid crystal display panel that forms a portion of the printer. When printing is complete, and the printed document is discharged to the discharge tray, the printed document is detected by a printed document sensor provided on the bottom surface of the discharge tray. This will illuminate an LED in order to inform one of the printer's use status. See, for example, Japanese Unexamined Patent Application Publication No. H06-191128.

However, with the aforementioned conventional technology, when an organization is composed of a plurality of departments that are each composed of a plurality of users, and the organization has a system by which a fee is charged to a department each time a user affiliated with that department uses equipment such as a printer or the like, one problem that occurs is when a user knows the user data (e.g., department code) of another department, and thus can avoid incurring a fee by inappropriately using that department code to use the equipment.

In view of the above, there exists a need for a user data management device, storage medium which stores a control program, and control method which overcome the above mentioned problems in the prior art. This invention addresses this need in the prior art as well as other needs, which will become apparent to those skilled in the art from this disclosure.

SUMMARY OF THE INVENTION

An object of the present invention is to efficiently report the identity of a user who is using equipment to one or more members of the department in which the equipment is located, or to managers of that department, so as to provide those members the use status of that equipment, and thereby control the use of that equipment by unauthorized users.

A user data management device of the present invention includes an input means, a notification means, an authentication means, and a notification determination means. The input means serves to input user data which will identify a user who will use equipment. The notification means serves to provide one or more persons with identity data concerning the user who is to use the equipment. The authentication means serves to perform authentication by comparing user data input with the input means and a plurality of pre-registered user data. The notification determination means serves to determine who is to be provided with identity data concerning the user authenticated by the authentication means.

Thus, the use of the equipment by unauthorized users can be controlled by efficiently reporting the identity of a user who is using the equipment to some or all members of the department in which that equipment is located, or to the managers of that department, so that they may be informed of the use status of the equipment.

Note that data input with the input means may be transmitted from outside the equipment. This allows, for example, appropriate countermeasures to be taken in the event that one attempts to use a web service without authorization (described below). In addition, a plurality of persons can be notified of the use status of the equipment. In this situation, a plurality of persons who need to know of the unauthorized use of equipment can be notified of the same.

Furthermore, the identification data may include the name of the equipment that a user will use. This allows one to easily manage the equipment during use.

Moreover, the one or more persons to be provided with the identity data may include the manager(s) of a department that an authenticated user is affiliated with. This allows one to more efficiently manage the equipment during use.

In addition, the one or more persons to be provided with the identity data may include the user of the user data input with the input means.

Furthermore, the notification means can also receive a response from one or more of the persons who were provided with identity data. In this situation, the user data management device may further include a countermeasure execution means that will perform countermeasures against the unauthorized use of equipment in the event that a response is received by the notification means from one or more of those persons provided with identity data.

Countermeasures here include, for example, stopping the use of the equipment, invalidating permission to use the equipment immediately after authentication was performed, etc.

A storage medium that stores a control program of the present invention is also disclosed. The control program is executed by a computer belonging to the user data management device. The control program causes the computer to function as an input means, a notification means, an authentication means, and a notification determination means. The input means serves to input user data which will identify a user who will use equipment. The notification means serves to notify one or more persons with identity data concerning the user who is to use the equipment. The authentication means serves to perform authentication by comparing user data input with the input means and a plurality of pre-registered user data. The notification determination means serves to determine who is to be provided with identity data concerning the user authenticated by the authentication means.

A control method of the present invention is performed by the user data management device, and includes an input step, a notification step, an authentication step, and a notification determination step. In the input step, user data regarding a user who is to use equipment will be input by means of the input means. In the notification step, one or more persons will be provided with identity data concerning the user who is to use the equipment. In the authentication step, authentication will be performed by comparing the user data input with the input means with a plurality of pre-registered user data. In the notification determination step, one or more persons who are to be provided with identity data concerning the user authenticated by the authentication means will be determined.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 shows a user data input screen;

FIG. 6 is a table showing authentication data;

DETAILED DESCRIPTION OF THE PREFERRED EMBODIMENTS

Figure 1:
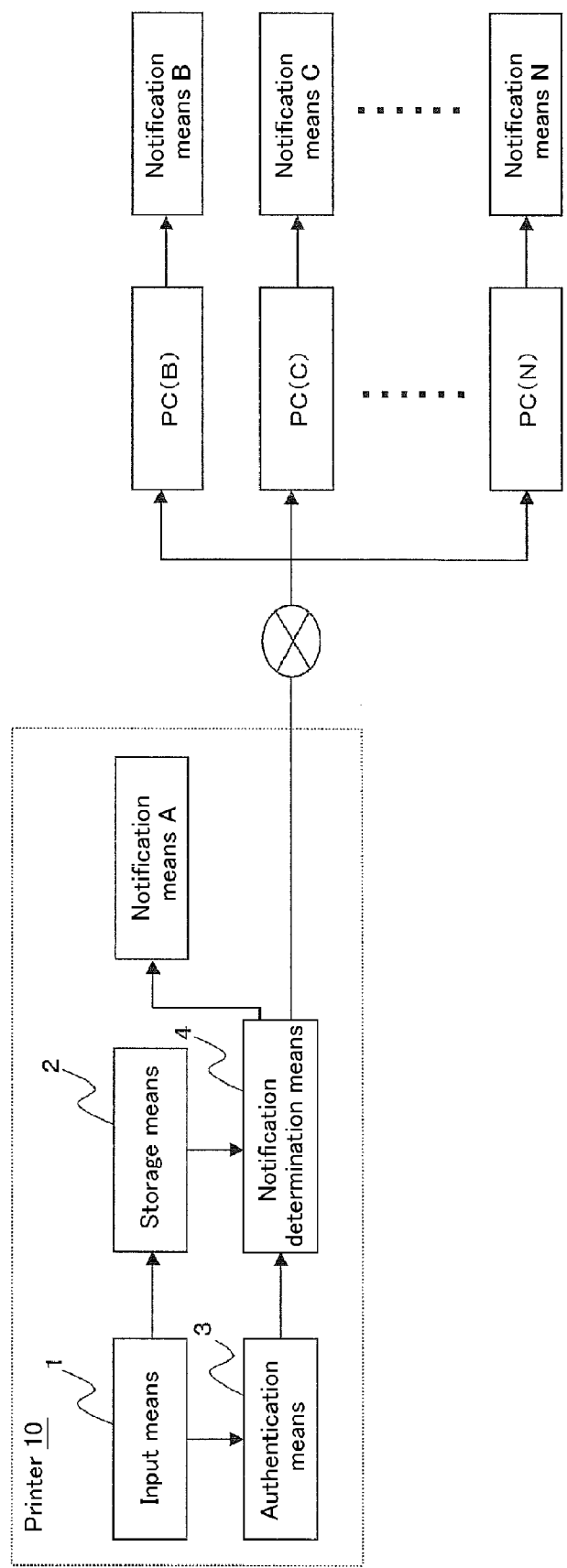
FIG. 1 shows a function block diagram of a user data management device according to a first embodiment of the present invention.
Figure 2:
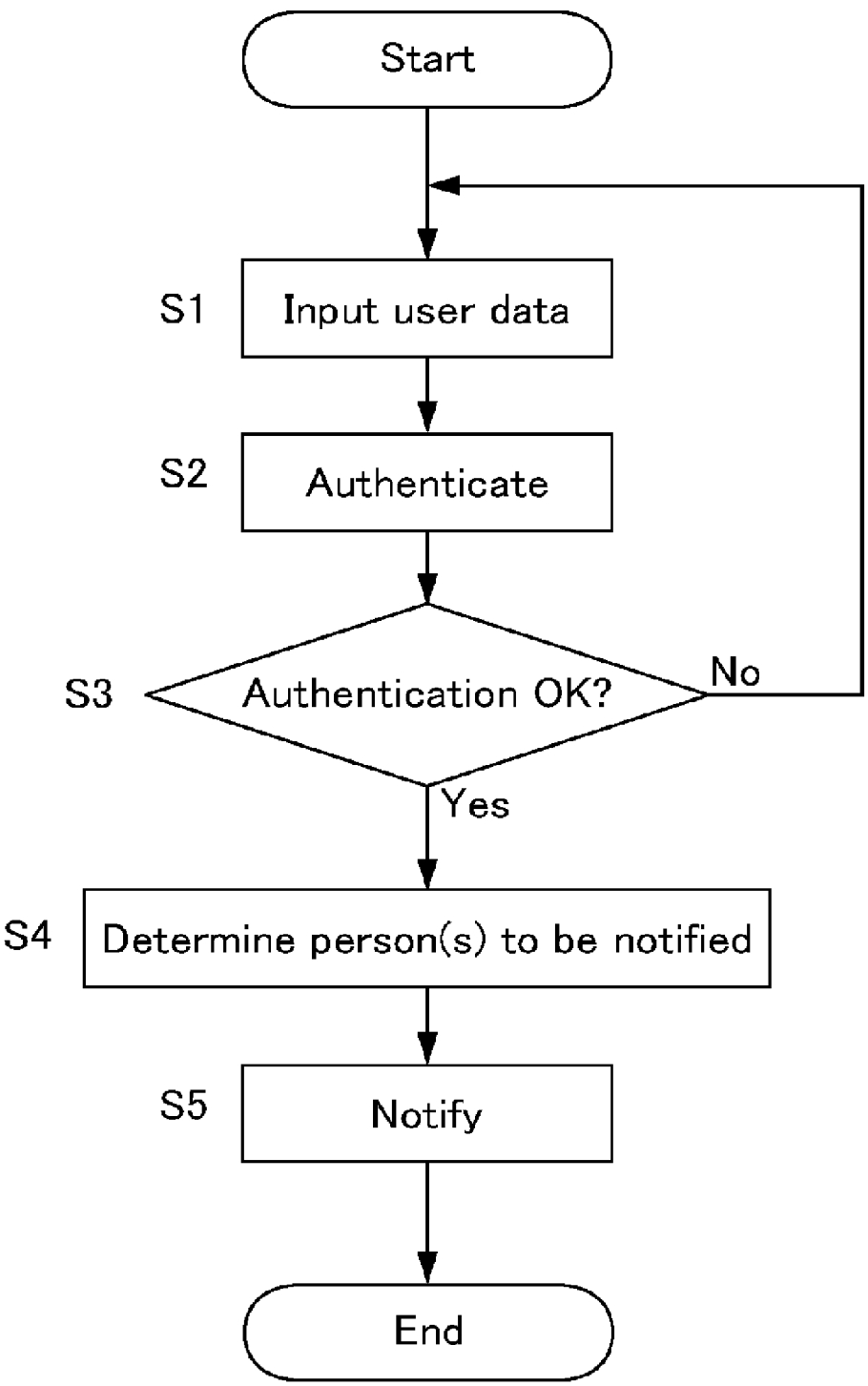
FIG. 2 is a flowchart showing the operation of the user data management device according to the first embodiment of the present invention.

FIG. 1 shows a function block diagram of a user data management device according to one embodiment of the present invention. FIG. 2 is a flowchart showing the operation of the user data management device.

In the present embodiment, the personal computers (PCs (B) to (N)) of a plurality of departments that a plurality of users is affiliated with are each connected to a printer 10 via a network. Each time a user uses the printer 10 via a PC, the department that that user is affiliated with will be charged a fee, and thereby allow a department to be managed.

In this organization, a unique department code is distributed to each department. Users will use the department code of the department that they are affiliated with, and will use the printer in a departmental unit.

A notification means A is provided in the printer 10, and notification means B-N are respectively connected to each PC B-N linked to the printer 10 via the network. Thus, when the printer 10 is being used, the identity of a user that is currently using the printer 10 will be provided. In the present embodiment, a lamp is used as the notification means, e.g., a lamp will be illuminated with a predetermined color that indicates the department that the user who is using the printer 10 is affiliated with. This lamp may be located at any location in which it is visible to those who need to see it, and may be a stand alone device, connected to each PC B-N, or be displayed on a PC monitor.

The user data management device of the present embodiment will be described below as one comprised of the printer 10 and the notification means B to N.

Figure 3:
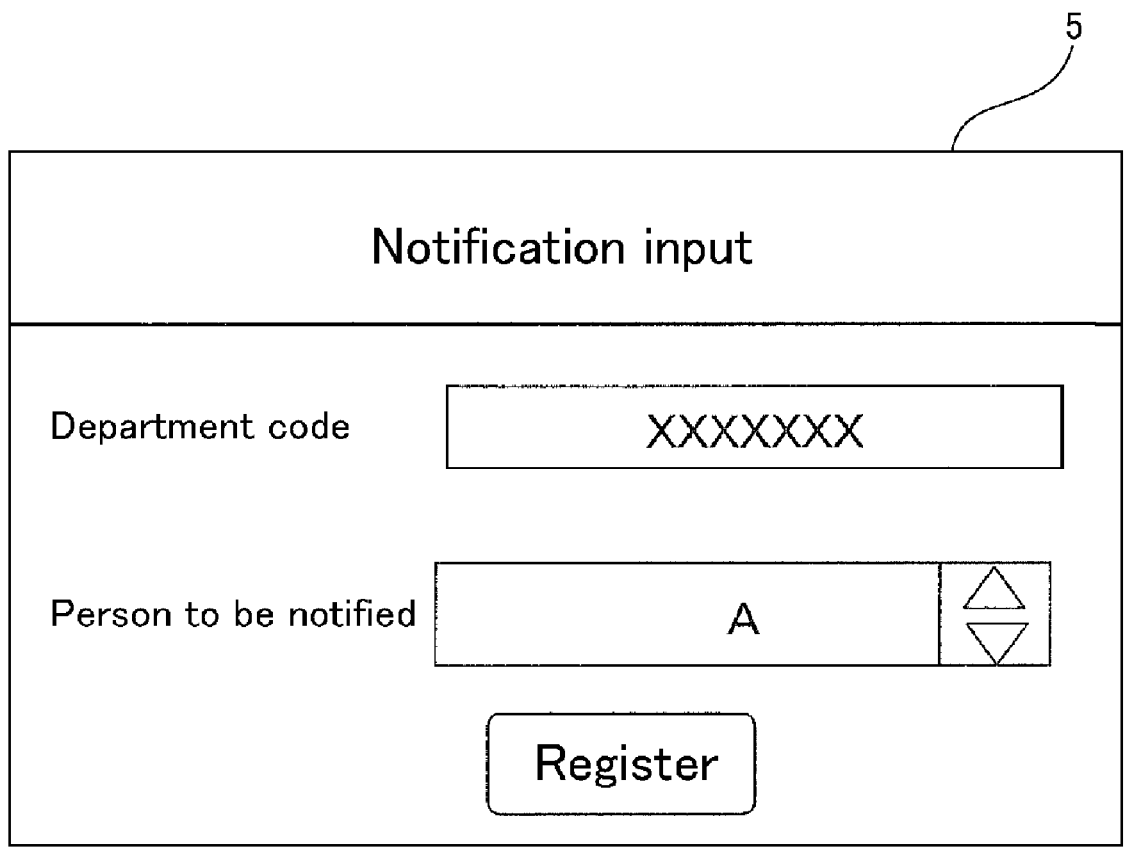
FIG. 3 shows a registration screen for persons to be notified.

First, as shown in FIG. 3, a notification input screen 5 will be displayed on a PC monitor, and persons to be notified in the event that the printer 10 is used in a department can be pre-registered by inputting the department code and the person to be notified by means of an input means 1 and pushing the "Register" button thereon.

A plurality of persons can be registered here, including some or all of the members of a department in which the printer 10 is located, or the managers of that department, but each person registered must be in possession of one of the notification means A-N.

Thus, by registering the persons to be notified, it will be possible to notify the department when unauthorized use of the printer 10 occurs.

Figure 4:
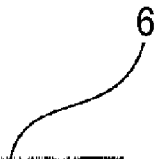
FIG. 4 is a table showing the persons to be notified.

When the persons to be notified are registered, as shown in table 6 of FIG. 4, the department (department code) that uses the printer 10, and the persons to be notified in that department, will be stored in a storage means 2 of the printer 10.

The operation of the user data management device of the present invention will be described below with reference to FIG. 2.

Figure 5:
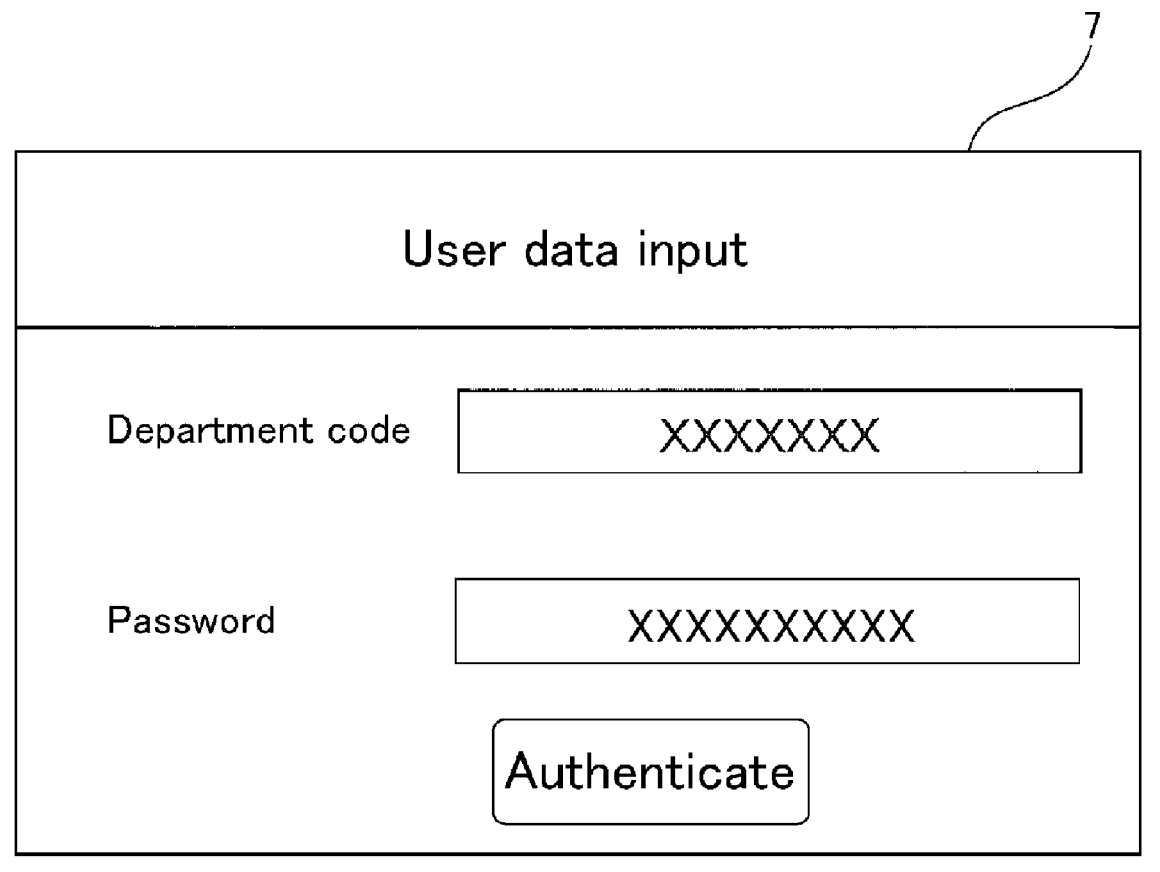

When the printer 10 is to be used, the user data input screen 7 shown in FIG. 5 will be displayed on a PC monitor, and a user will input therein the department code of the department that he or she is affiliated with, and his or her password, by means of the input means 1 (S1).

When the user pushes the "Authenticate" button after the aforementioned data is input, a comparison and authentication of the department code and password that were input will be performed by means of an authentication means 3 in the printer 10. The authentication means 3 stores an authentication table in which, as shown in FIG. 6, department codes and passwords are associated with each other (S2).

If the authentication is determined to be successful in the determination process step S3, the user will begin use of the printer 10 via a PC. At that point, a notification determination means 4 in the printer 10 will activate, the notification table 6 stored in the storage means 2 will be read out, and the person(s) therein associated with the department code with which authentication was successfully completed will be determined (S4).

The persons to be notified that were determined in Step S4 will be notified by means of a lamp that is illuminated with the color of the department that the user of the printer 10 is affiliated with (S5).

On the other hand, if the authentication in the determination process step S3 was not successful, the process will return to Step S1, and the printer 10 will wait for user data to be input.

By efficiently reporting the identity of a user who is using equipment to some or all members of the department in which that equipment is located, or to managers of that department, in order to be informed of the use status of that equipment, the use of that equipment by unauthorized users can be controlled.

OTHER EMBODIMENTS

Note that the notification means is not limited to a lamp, and may be a speaker or the like. In this situation, a sound that identifies a department can be predetermined for each department, and a sound corresponding to a department can be played.

In addition, the notification means may be configured so that it performs notification with, for example, or a pop-up screen on the monitor of a PC or the like, a small liquid crystal panel that can display text data and installed on a PC. Furthermore, identification data displayed on the pop-up screen and liquid crystal panel may also include the name of the equipment that is currently being used.

Furthermore, when the storage means is configured to also store notification history, and a person to be notified is not available when notification occurs, the notification means may be designed so that the notification history can be checked by that person at a later date.

In addition, a printer was used as an example of the equipment that makes up the user data management device, however a copy machine, scanner, and other equipment can be used as well.

Moreover, examples of equipment that makes up the user data management device not only includes image forming devices, but also includes devices that are used by means of user authorization, such as an ATM (Automatic Teller Machine) or the like, or servers that provide various services by means of user authentication, such as web services like internet shopping and credit card usage.

In this situation, even in the event that an unauthorized person has used the image forming device, ATM, web service, or credit card, a user can be notified by their cellular telephone that the service is being used, and thus the user can be informed of the fraud and take prompt steps to stop the service.

In addition, the person to be notified may be the user of the user data input with the input means. In this situation, for example, an e-mail address or IP address that was pre-registered as user data may be the location to which the notification is to be sent. Thus, the notification means can be provided with a communication function.

Figure 7:
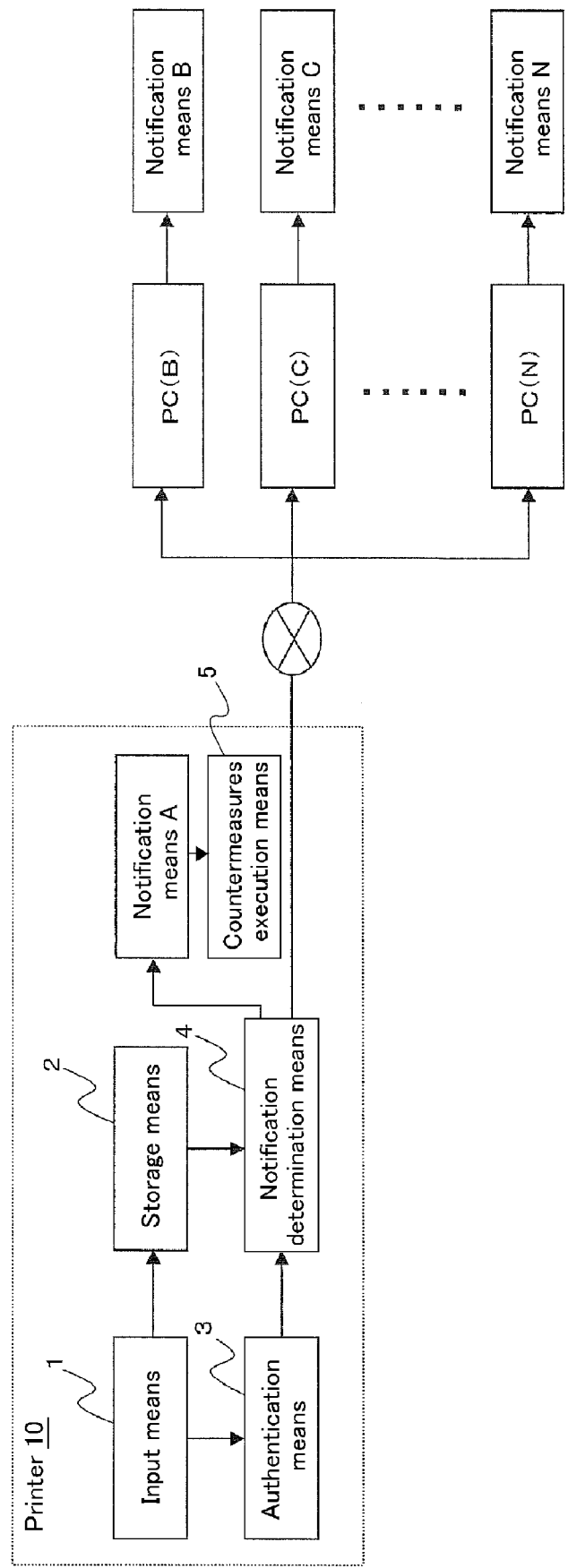
FIG. 7 shows a function block diagram of a user data management device according to another embodiment of the present invention.

Furthermore, the notification means can receive a response from the person to be notified. In this situation, as shown in FIG. 7, the user data management device may further include a countermeasure execution means 5 that will take countermeasures against the unauthorized use of the equipment when a response is received from the person to be notified within a predetermined period of time. Countermeasures here include, for example, stopping the use of the equipment, invalidating the use of the equipment immediately after authentication was performed, etc. In this situation as well, the notification means can be provided with a communication function.

Figure 8:
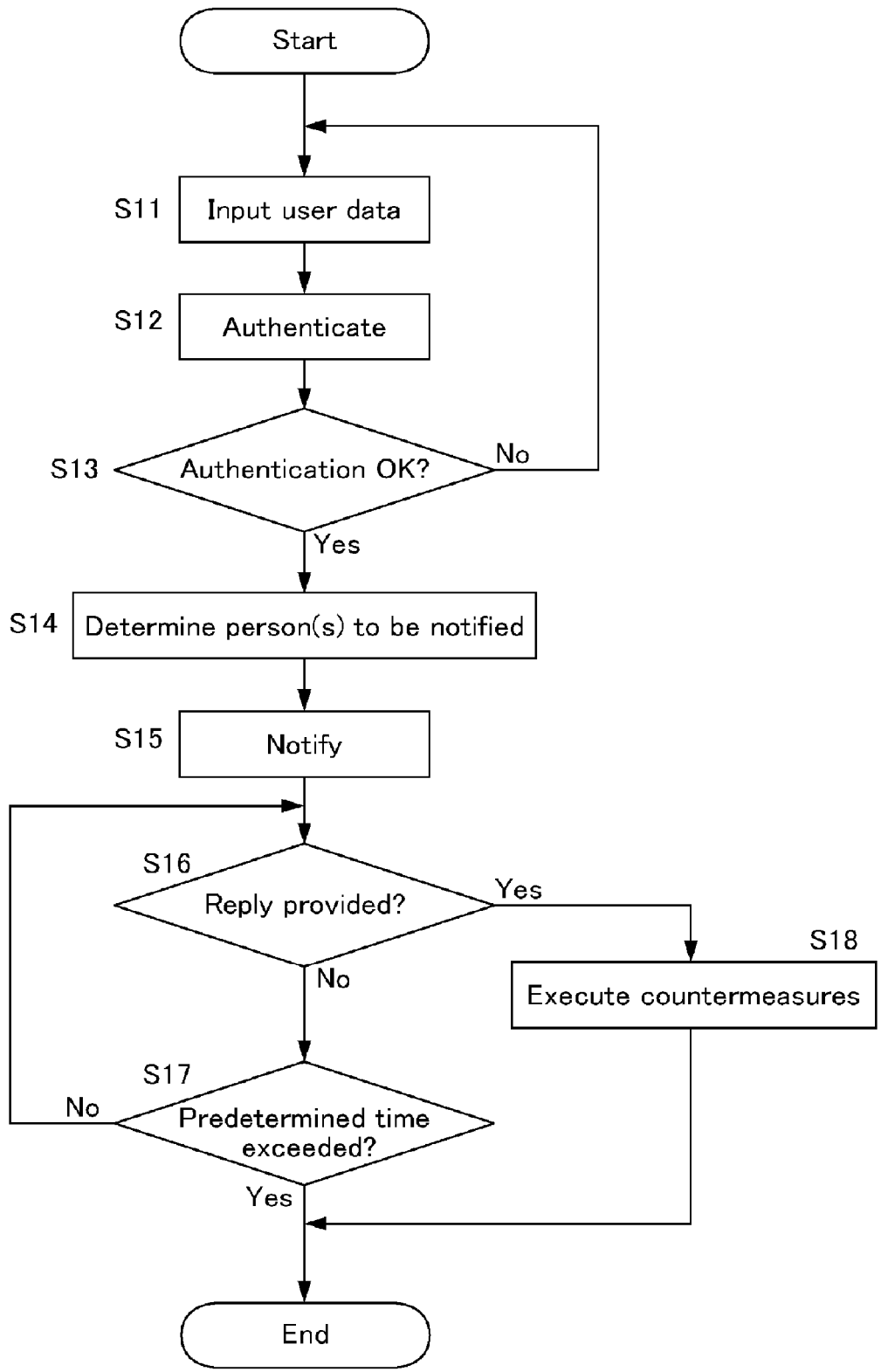
FIG. 8 is a flowchart showing the operation of the user data management device according to the other embodiment of the present invention.

As shown in FIG. 8, after Steps S11 to S15 are performed as in Steps S1 to S5 in FIG. 2, it will be determined whether or not there is a response (S16), and if there is a response, countermeasures will be performed (S18). However, if there is no response within a predetermined period of time (S16 is no, and S17 is yes), then the process will end.

In this configuration, for example, use of the equipment can be stopped if a user receives an e-mail sent from the equipment, and then responds to that e-mail.

Figure 9:
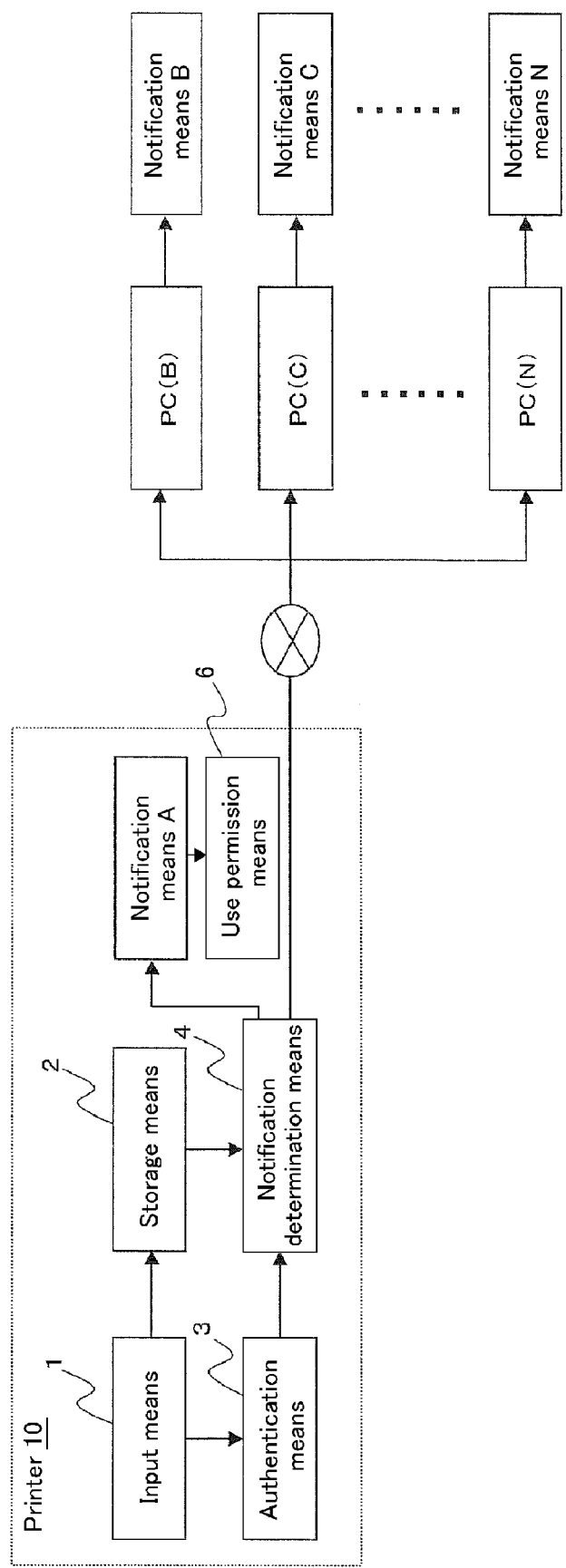
FIG. 9 shows a function block diagram of a user data management device according to yet another embodiment of the present invention.

In addition, use permission can be performed instead of the aforementioned countermeasures. More specifically, as shown in FIG. 9, the user data management device may further include a use permission means 6 that will permit the use of equipment in the event that a response is received from the person to be notified within a predetermined period of time.

Figure 10:
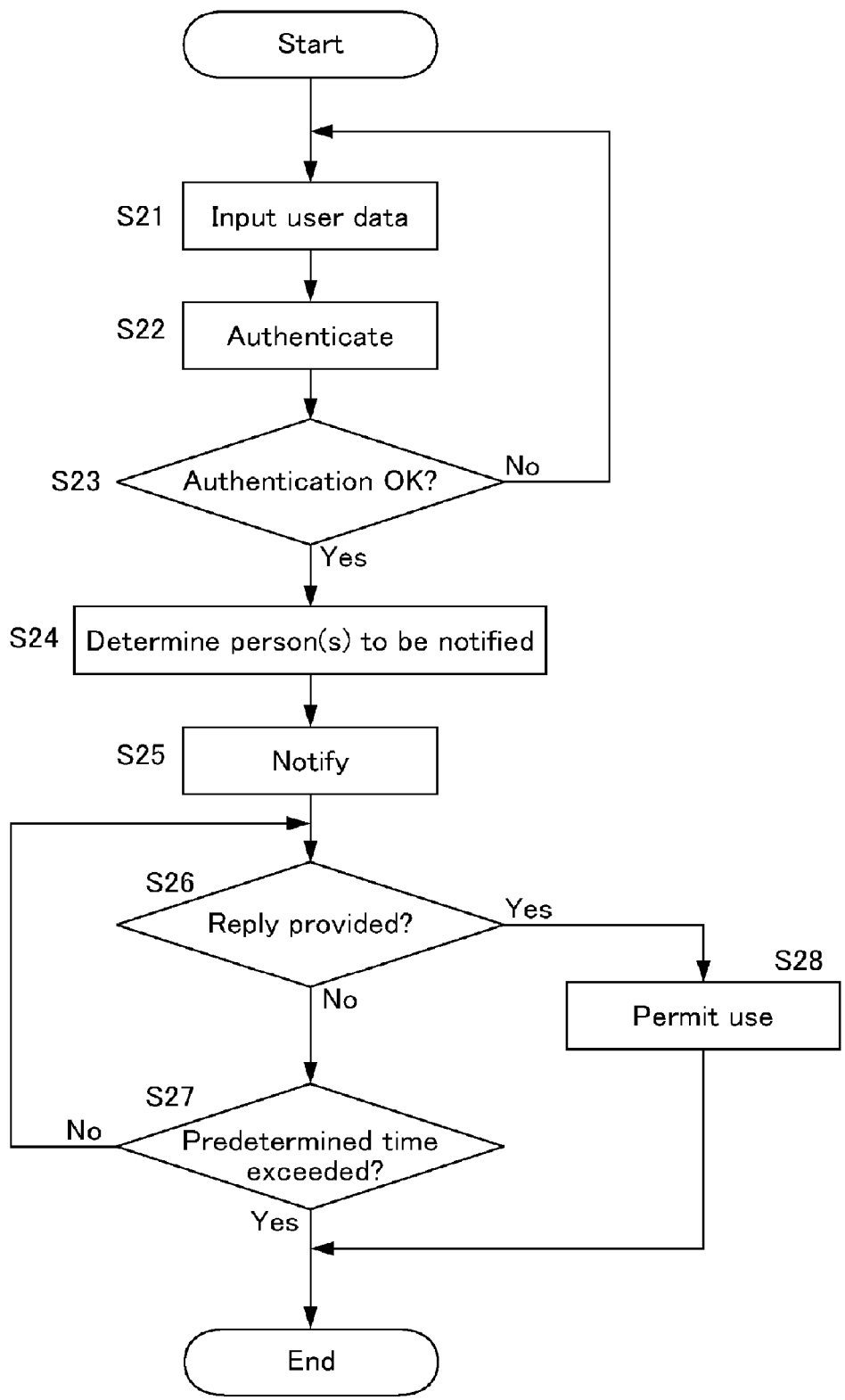
FIG. 10 is a flowchart showing the operation of the user data management device according to the yet other embodiment of the present invention.

As shown in FIG. 10, after Steps S21 to S25 are performed as in Steps S11 to S15 in FIG. 8, it will be determined whether or not there is a response (S26), and if there is a response, the use of the equipment will be permitted (S28). However, if there is no response within a predetermined period of time (S26 is no, and S27 is yes), then the process will end.

With this configuration, a response can be confirmed so that the equipment can begin to be used, and thus is effective in situations in which advanced security is required.

INDUSTRIAL APPLICABILITY

By efficiently reporting the identity of a user who is using equipment to some or all members of the department in which that equipment is located, or to managers of that department, in order to be informed of the use status of that equipment, the use of that equipment by unauthorized users can be controlled.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A user data management device, comprising:
   an image forming device being connected a network accessible by a plurality of users;
   at least one first personal computer being used by one user of the plurality of users, and being connected to the image forming device via the network, the first personal computer having a first notification device; and
   a second personal computer being used by a manager, and being connected to the image forming device and first personal computer via the network, the second personal computer having a second notification device,
   the image forming device having
      an input device which inputs user data that identifies the one user who will use the image forming device by sending user data including printing data from the first personal computer to the image forming device,
      an authentication device that performs authentication by comparing the user data input to the input device to pre-registered user data,
      a notification determination device that determines the one user and the manager being provided with identity data of the one user authenticated by the authentication device on the basis of the pre-registered user data, and
      a third notification device,
   the first, second, and third notification devices providing identity data of the one user using the image forming device determined by the notification determination device.

2. The user data management device set forth in claim 1, wherein the identity data includes the name of the image forming device that the user will use.

3. The user data management device set forth in claim 1, wherein the manager provided with the identity data include a plurality of managers of a department using a plurality of second personal computers.

4. The user data management device set forth in claim 1, wherein
   the notification device is configured to receive a response from the one user or administrator provided with the identity data, and further comprising a countermeasures execution device that performs countermeasures against unauthorized use of the image forming device when a response is received by the notification device from the one user or manager provided with the identity data.

5. The user data management device set forth in claim 1, wherein
the notification devices are configured to receive a response from the one user or administrator provided with the identity data, and
further comprising a use permission device that permits use of the image forming device when a response is received by the notification device from the one user or manager provided with the identity data.

6. A storage medium comprising a control program stored thereon that is executed by a computer of an image forming device, the control program comprising:
code for an input device which inputs user data to identify a user who will use the image forming device being connected to a network accessible by a plurality of users, one user of the plurality of users using a first personal computer being connected to the image forming device via the network, and a manager using a second personal computer being connected to the image forming device and first personal computer via the network;
code for an authentication device to perform authentication by comparing the user data input to the input device to pre-registered user data;
code for a notification determination device to determine the one user and the manager being provided with identity data of the one user authenticated by the authentication device on the basis of the pre-registered data; and
code to provide notification devices of the one user and the manager with the identity data of the one user who will use the image forming device determined by the notification determination device.

7. The storage medium set forth in claim 6, wherein the identity data includes the name of the image forming device that the user will use.

8. The storage medium set forth in claim 6, wherein the manager provided with the identity data include a plurality of managers of a department using a plurality of second personal computers.

9. The storage means medium set forth in claim 6, wherein the notification device is configured to receive a response from the one user or manager provided with the identity data, and
the control program further causes the computer to function as a countermeasures execution device that performs countermeasures against unauthorized use of the image forming device when a response is received by the notification device from the one user or manager provided with the identity data.

10. The storage medium set forth in claim 6, wherein the notification device is configured to receive a response from the one user or manager provided with the identity data, and
the control program further causes the computer to function as a use permission device that permits use of the image forming device when a response is received by the notification device from the one user or manager provided with the identity data.

11. A control method for an image forming device, comprising the steps of:
inputting user data on a user who is to use image forming device by an input device of the image forming device being connected to a network accessible by a plurality of users, one user of the plurality of users using a first personal computer being connected to the image forming device via the network, and a manager using a second personal computer being connected to the image forming device and first personal computer via the network;
performing authentication by comparing the user data input with the input device to pre-registered user data in an authentication device;
determining the one user and the manager being provided with identity data of the one user authenticated by the authentication device; and
providing the one user and the manager with the identity data to identify the one user who will use the image forming device.

12. The control method set forth in claim 11, wherein the identity data includes the name of the image forming device that the user will use.

13. The control method set forth in claim 11, wherein the manager provided with the identity data include a plurality of managers of a department using a plurality of second personal computers.

14. The control method set forth in claim 11, wherein
a response is receivable from the one user or manager provided with the identity data, and
the control method further comprises the step of performing countermeasures against unauthorized use of the image forming device when a response is received from the one user or manager provided with the identity data.

15. The control method set forth in claim 11, wherein
a response is receivable from the one user or manager provided with the identity data, and
further comprising the step of permitting use of the image forming device when a response is received by the notification device from the one user or manager provided with the identity data.

* * * * *